United States Patent
DiLaura (10) Patent No.: US 9,966,985 B2
(45) Date of Patent: May 8, 2018

(54) PHONE CASE WITH CAMERA

(71) Applicant: Case Cam LLC, Winter Garden, FL (US)

(72) Inventor: Angelo DiLaura, Hasbrouck Heights, NJ (US)

(73) Assignee: Case Cam LLC, Winter Garden, NJ (US)

(*) Notice: Subject to any disclaimer, the term of this patent is extended or adjusted under 35 U.S.C. 154(b) by 0 days. days.

(21) Appl. No.: 15/461,585

(22) Filed: Mar. 17, 2017

(65) Prior Publication Data

US 2017/0272112 A1     Sep. 21, 2017

Related U.S. Application Data

(60) Provisional application No. 62/310,767, filed on Mar. 20, 2016.

(51) Int. Cl.
| | |
|---|---|
| *H04M 1/00* | (2006.01) |
| *H04B 1/3888* | (2015.01) |
| *H04M 1/02* | (2006.01) |
| *H04W 4/00* | (2018.01) |

(52) U.S. Cl.
CPC ........ *H04B 1/3888* (2013.01); *H04M 1/0264* (2013.01); *H04W 4/008* (2013.01)

(58) Field of Classification Search
CPC ... H04B 1/3888; H04M 1/0264; H04W 4/008
USPC ...................................................... 455/575.1
See application file for complete search history.

(56) References Cited

U.S. PATENT DOCUMENTS

| | | | |
|---|---|---|---|
| 4,714,184 | A | 12/1987 | Young et al. |
| 6,637,896 | B2 | 10/2003 | Li et al. |
| 6,751,473 | B1 | 6/2004 | Goyal et al. |
| 6,752,369 | B1 | 6/2004 | Cameron |

(Continued)

FOREIGN PATENT DOCUMENTS

| | | |
|---|---|---|
| CN | 201044073 Y | 4/2008 |
| CN | 203761442 U | 8/2014 |

(Continued)

OTHER PUBLICATIONS https://www.pinterest.com/pin/62276407319000344/ (Fish Eyes Rod & Reel).

(Continued)

*Primary Examiner* — Sanh Phu
(74) *Attorney, Agent, or Firm* — Werschulz Patent Law, LLC; Patricia P. Werschulz (57) ABSTRACT

A case and a system for wirelessly pairing, storing and charging an adjunct camera to a handheld electronic device, such as a smartphone. A software application on the device controls the adjunct camera. In one embodiment, the case provides a telescopic rod to elevate the adjunct camera. In another embodiment, the case provides a cable on a retractor reel operative for connecting the adjunct camera to the case. The adjunct camera is selectively detachable from the case and attachable to a user or other object for hands-free operation once the software app is engaged. The case, the adjunct camera, the electronic device and the app comprise a system for capturing, streaming and saving video and photos by expanding the reach of the native camera function of the electronic device.

18 Claims, 7 Drawing Sheets

(56) References Cited

U.S. PATENT DOCUMENTS

| | | | |
|---|---|---|---|
| 6,774,948 | B1 | 8/2004 | Inoue |
| 7,233,344 | B2 | 6/2007 | Leichter |
| 7,477,315 | B2 | 1/2009 | Shin |
| 7,957,765 | B1 | 6/2011 | Causey et al. |
| 7,973,856 | B2 | 7/2011 | Lee et al. |
| 8,203,646 | B2 | 6/2012 | Fan |
| 8,280,242 | B2 | 10/2012 | Young et al. |
| 8,622,637 | B2 | 1/2014 | Roshanravan |
| 8,798,453 | B2 | 8/2014 | Lawton |
| 9,031,610 | B2 | 5/2015 | Kulas |
| 9,071,902 | B1 | 6/2015 | Ai |
| 9,300,347 | B1 | 3/2016 | Coverstone |
| 9,423,671 | B2 | 8/2016 | O'Neill et al. |
| 2002/0013161 | A1* | 1/2002 | Schaeffer ............ H04M 1/0262 455/557 |
| 2003/0209604 | A1 | 11/2003 | Harrison |
| 2006/0068722 | A1 | 3/2006 | Ashman, Jr. |
| 2006/0152576 | A1 | 7/2006 | Kiessling et al. |
| 2006/0287006 | A1 | 12/2006 | McIntyre et al. |
| 2007/0064108 | A1 | 3/2007 | Haler |
| 2009/0003822 | A1 | 1/2009 | Tyner |
| 2012/0153065 | A1 | 6/2012 | Fisher |
| 2014/0011549 | A1 | 1/2014 | Shu et al. |
| 2014/0132781 | A1 | 5/2014 | Adams et al. |
| 2015/0029352 | A1 | 1/2015 | Burciaga |
| 2015/0102074 | A1 | 4/2015 | Elgan |
| 2015/0156898 | A1* | 6/2015 | Shin ................... H04M 1/0256 361/679.02 |
| 2015/0187187 | A1* | 7/2015 | Del Toro ............ H04M 1/7253 340/539.11 |
| 2015/0289634 | A1 | 10/2015 | Chavez |
| 2016/0277685 | A1 | 9/2016 | Lombardi et al. |
| 2016/0316046 | A1 | 10/2016 | Zheng |
| 2017/0034319 | A1* | 2/2017 | Chenn ................. H04N 5/2251 |

FOREIGN PATENT DOCUMENTS

| | | |
|---|---|---|
| CN | 104378465 A | 2/2015 |
| CN | 204227000 U | 3/2015 |
| CN | 204692988 U | 10/2015 |
| WO | 01/06344 A1 | 1/2001 |
| WO | 2015/028101 A1 | 3/2015 |
| WO | 2016/166607 A1 | 10/2016 |

OTHER PUBLICATIONS https://www.aliexpress.com/item/Rock-Easy-Shot-Series-With-Shutter-Macro-Len-Fisheye-Wide-Len-Detachable-Bluetooth-Case-For-iPhone/32554989166.html (Alix Express—Rock Easy Shot Series With Shutter Macro Len Fisheye Wide Len Detachable Bluetooth Case for iPhone 6/6s 6 plus /6s Plus TPU Case).
http://www.3ders.org/articles/20160404-3d-printed-drone-in-a-phone-by-buzz-technology-among-finalists-of-british-inventors-project-2016.html (www.3ders.org 3D printer and 3D printing news—3D printed drone-in-a-phone by Buzz Technology among finalists of British Inventors Project 2016—Apr. 4, 2016—Alec).
http://www.dailymail.co.uk/sciencetech/article-3534923/The-phone-case-comes-built-DRONE-Prototype-design-includes-UAV-help-better-selfies.html (The phone case that comes with a built-in DRONE: Prototype design includes UAV to help take better selfies—published Apr. 11, 2016).
https://www.youtube.com/watch?v=udiiIKQfPag&feature=youtu.be (Drone in a Phone—Buzz Technology British Inventors Project Finalist at Gadget Show LIVE 2016).
http://www.gizmag.com/wvilconceptdigitalcamerasmartphone/18509/ (New Atlas—WVIL concept: Digital SLR meets mobile phone, with an ingenious twist—Paul Ridden—Apr. 28, 2011).
http://blog.gsmarena.com/sonylaunchesspecialxperiazultracasetoattachtheqx10100camera/ (Sony launches special peria Z Ultra case to attach the QX10/100 camera—Jan. 1, 2014, 11:33).

* cited by examiner

PHONE CASE WITH CAMERA

CROSS-REFERENCE TO RELATED APPLICATIONS

This application is a nonprovisional utility application of the provisional patent application, Ser. No. 62/310,767, filed in the United States Patent Office on Mar. 20, 2016 and claims the priority thereof and is expressly incorporated herein by reference in its entirety

TECHNICAL FIELD

The present disclosure relates generally to a case for a smartphone or other handheld electronic device. More particularly, the present disclosure relates to a case for a smartphone or handheld electronic device with an adjunct camera controlled by the device.

BACKGROUND

In the last decade or so, smartphones, tablet computers, phablets and other similar handheld electronic devices have changed photography, videography and communications. Most if not all these devices have a camera and a microphone capable of photography and video. The smartphone and related devices have created a new vocabulary with such terms as selfie, plug-and-play and hot spot.

The interaction between these devices and social media have created such phenomenon as streaming video, streaming video social media platforms, photo platforms, selfie sticks and apps dedicated to hosting the latest photo or video to share with friends. The smartphone and related devices have created a new vocabulary with such terms as selfie, plug-and-play and hot spot.

The selfie stick is invaluable to the user who wants to capture themselves and friends in a photo or video by placing the device at a distance sufficient for the camera in device to capture an image. The selfie stick is a "smart stick" that allows the user to hold the base of the stick in one hand where auxiliary controls operate the device's camera.

Selfie sticks require at least one hand for operating the camera function of the phone. Generally, the selfie stick is too small to support larger handheld electronic devices such as a tablet computer that has a camera function.

People bring selfie sticks to entertainment events such as concerts and sports events to capture a picture from a point above the crowd. Selfie sticks have created security issues. Many venues have banned them because they can be used as weapons. Others have banned because they annoy the people in the rear of an auditorium or stadium by blocking the view.

While these selfie sticks may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a smartphone case that facilitates streaming video. Accordingly, an aspect of an example embodiment in the present disclosure provides an adjunct camera that extends from the smartphone case to easily capture photos and video.

Another aspect of an example embodiment in the present disclosure is to provide a smartphone case that expands the reach of the smartphone for capturing and streaming video and photos. Accordingly, the present disclosure provides a telescoping rod within the case to elevate an adjunct camera, expanding the reach of the smartphone.

A further aspect of an example embodiment in the present disclosure is to provide a system for capturing, streaming and saving video and photos beyond the reach of a native camera in a smartphone. Accordingly, the present disclosure provides a system comprising a case, an adjunct camera, an electronic device and an app operative for capturing, streaming and saving video and photos by expanding the reach of the native camera function of the electronic device.

Accordingly, the present disclosure describes a case and a system for wirelessly pairing, storing and charging an adjunct camera to a handheld electronic device, such as a smartphone. A software application on the device controls the adjunct camera. In one embodiment, the case provides a telescopic rod to elevate the adjunct camera. In another embodiment, the case provides a cable on a retractor reel operative for connecting the adjunct camera to the case. The adjunct camera is selectively detachable from the case and attachable to a user or other object for hands-free operation once the software app is engaged. The case, the adjunct camera, the electronic device and the app comprise a system for capturing, streaming and saving video and photos by expanding the reach of the native camera function of the electronic device.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
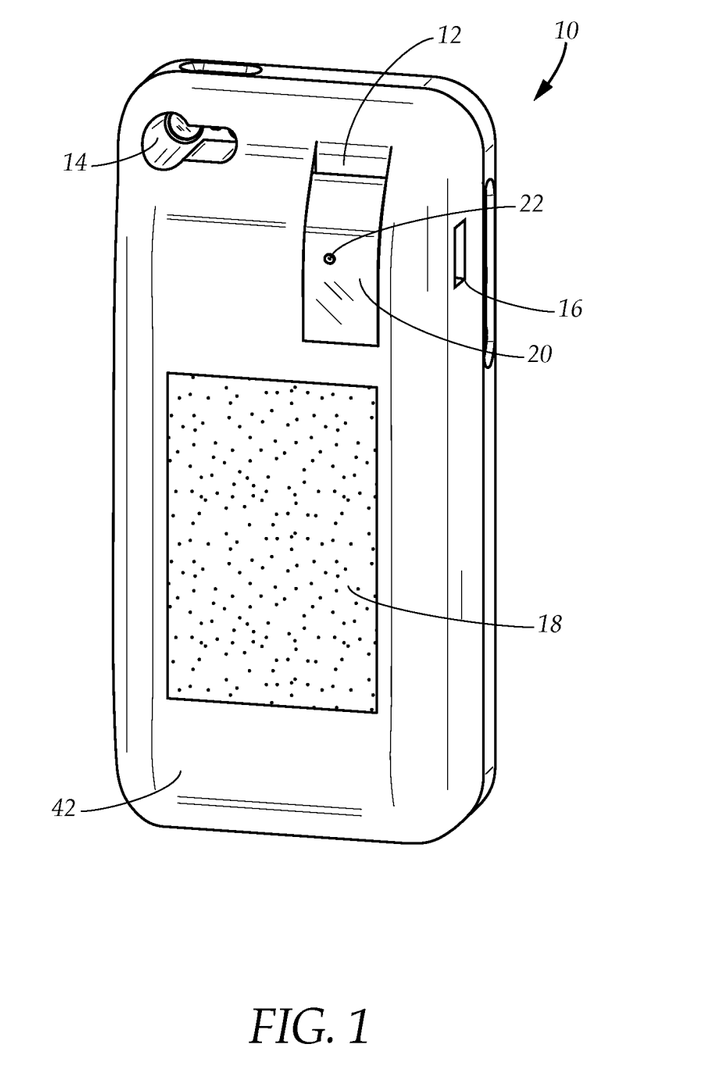
FIG. 1 is perspective view of an example embodiment of a smartphone case exterior having an external camera.

FIG. 1 illustrates an example embodiment of a case 10 for a smartphone or a similar electronic device, such as a tablet computer, a phablet and other handheld devices that support a camera function and transfer or stream data wirelessly to a router or a cellular network. For ease of reading comprehension, the term smartphone is used but it is understood that it encompasses these and other similar handheld electronic devices.

The case 10 has a recess 12 for storing an adjunct camera 20 in a back wall 42. The adjunct camera 20 is flush with the case, fitting snuggly into the recess 10 so that the case back wall 42 and the adjunct camera form a flat surface.

Within the recess 12 is stored an example embodiment of a retractable extender mechanism. In this example embodiment, the retractable extender mechanism is a telescoping rod 30 shown extended in FIG. 3A and FIG. 3B. The rod 30 has a top end 30T and includes a plurality of telescoping portions 32 that allow the rod to extend preferably three times the length of the case above the recess 12 in the case 10. The rod 30 is preferably made from carbon fiber.

Figure 3A:
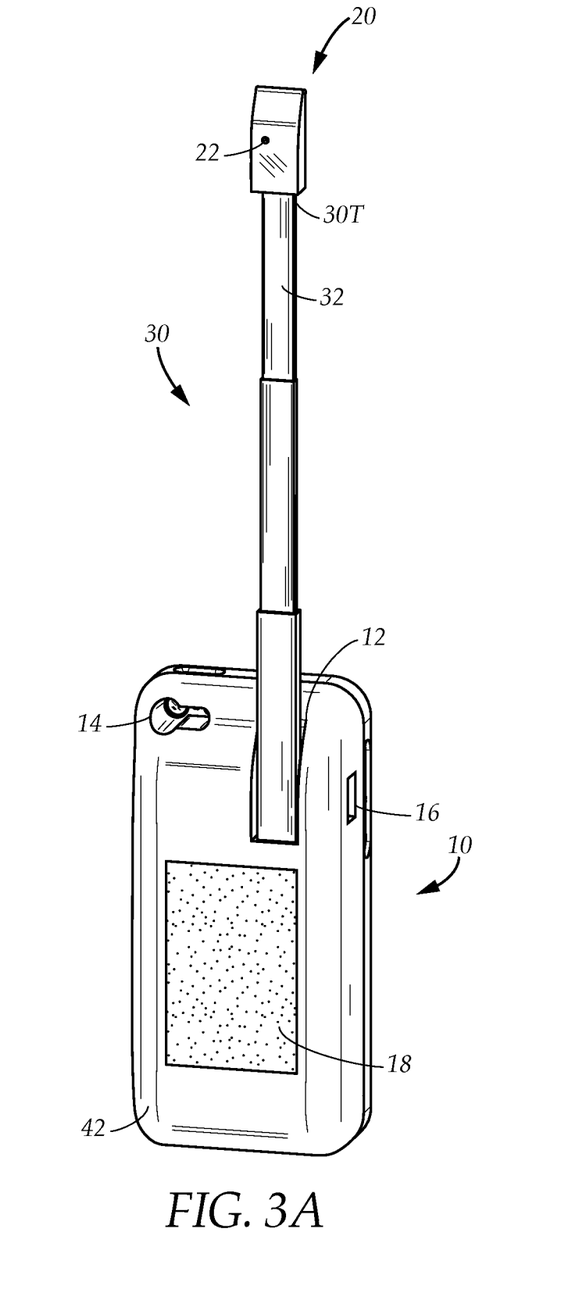
FIG. 3A is perspective view from the rear of the smartphone case exterior with an extended rod.
Figure 3B:
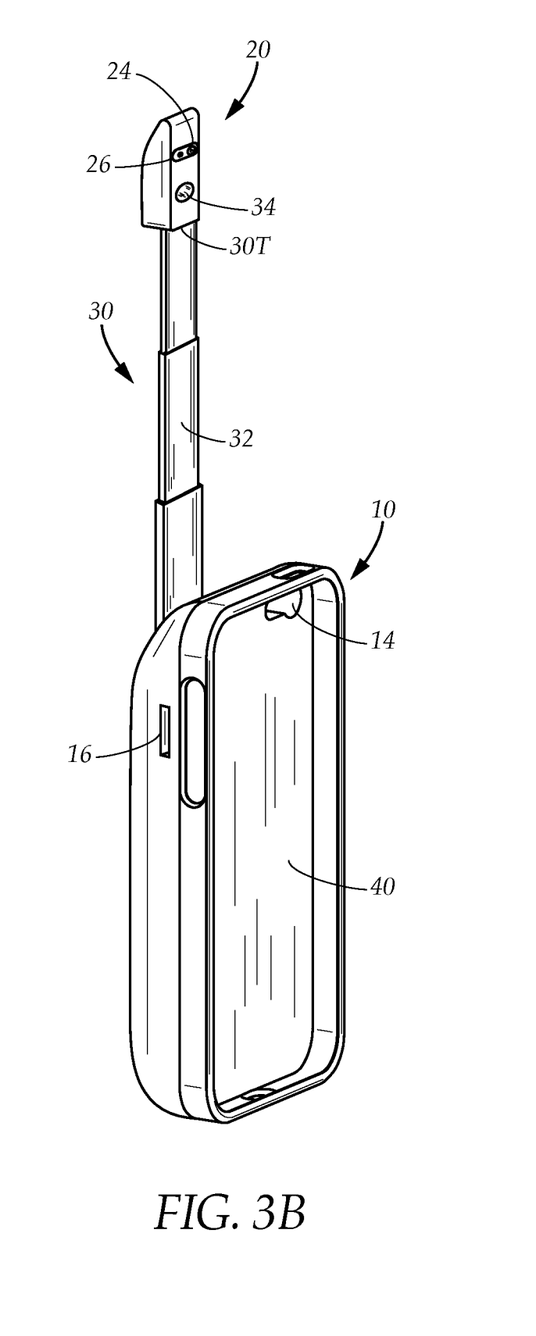
FIG. 3B is perspective view from the rear of the smartphone case exterior with the extended rod.

Atop the rod end 30T is the adjunct camera 20 connecting to the rod 30 by a swivel joint 34 that allows the camera to rotate into a plurality of positions for framing the desired photo or video. In one example embodiment, the adjunct camera 20 selectively detaches from the rod 30 for use as a hands-free device.

The adjunct camera 20 has a lens 24 and a flash 26. When the rod 30 is retracted and the rod and adjunct camera 20 store in the recess 12, the lens 24 and the flash 26 face inwardly in the case 10. The lens 24 and the flash 26 are thus protected when stored in the case 10. The adjunct camera 20 recharges when stored in the recess, drawing from the battery in the case 10. The case 10 has an opening 14 for a native camera native to and an integrated component to the smartphone.

The adjunct camera 20 has an indicator 22 that lights when the camera is in use and paired with the an "app" (software application) on the smartphone as described hereinbelow.

The case has a rechargeable battery 18 that recharges through a USB (universal serial bus) port 16.

Figure 2:
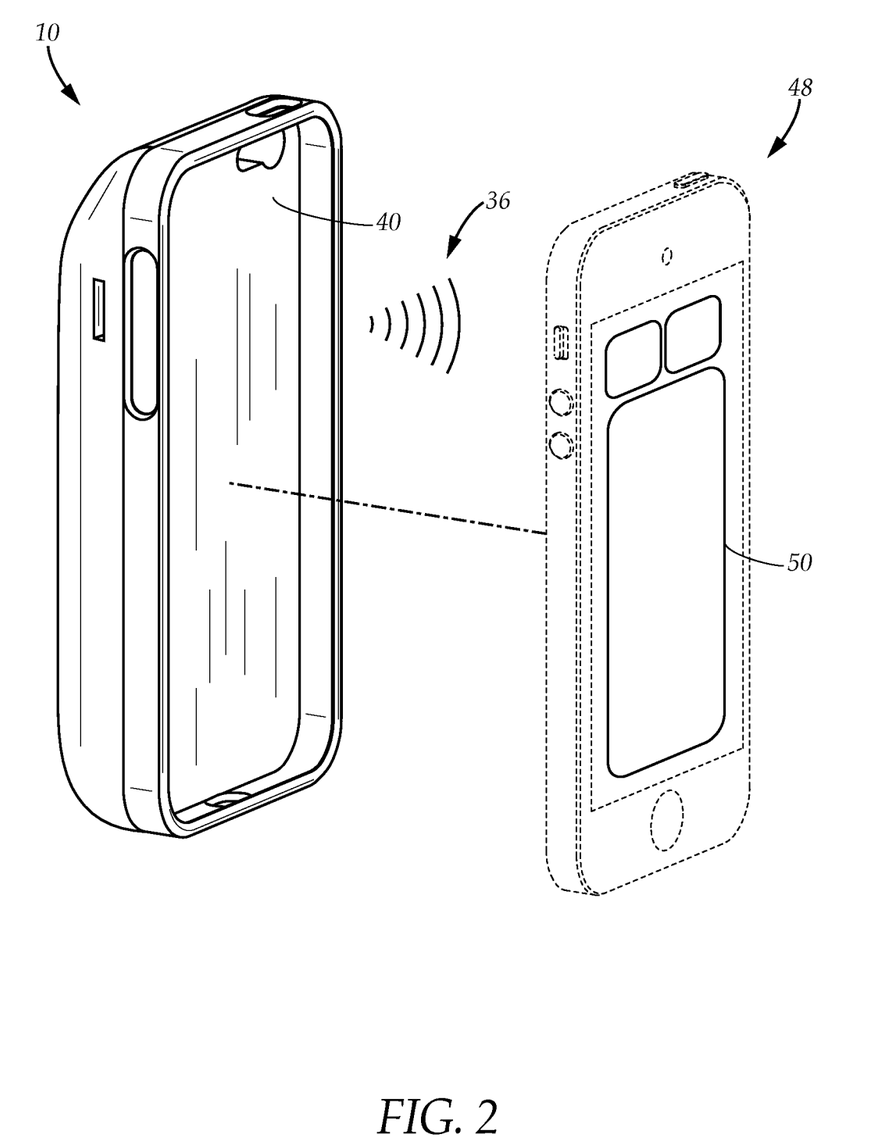
FIG. 2 is a perspective view of a smartphone inserting into the smartphone case.

In FIG. 2, a smartphone 48 is placed inside the case 10. The adjunct camera (not shown) pairs and communicates with smartphone 48 wirelessly 36. The adjunct camera pairs with the smartphone 48 via an app 50 on the smartphone allowing images to be selectively saved, shared and streamed by the smartphone directly from the adjunct camera.

The smartphone 48 controls the adjunct camera through the app 50. The adjunct camera 20 goes into sleep mode when the adjunct camera is not in use and the app is open, maintaining the pairing of the smartphone and the app. By maintaining the pairing of the adjunct camera 20 with the smartphone 48, a user can quickly access the adjunct camera to capture a photo or to begin live streaming mode when needed.

It is understood that the case 10 is suitable for other handheld electronic devices as explained hereinabove by modifying the dimensions of the case and the ratio of length to width of the case. The case 10 for the handheld electronic device has the telescoping rod 30 and adjunct camera 20 connecting to the rod by a swivel joint 34 as explained hereinabove. The handheld electronic device has the app 50 for pairing and controlling the adjunct camera 20 by the device as described hereinabove.

Figure 5:
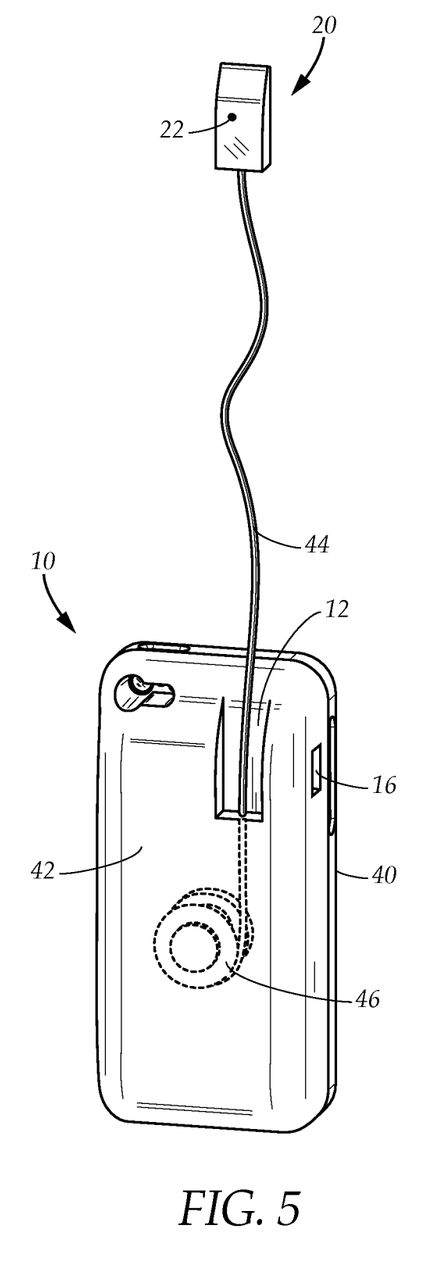
FIG. 5 is a perspective of a further example embodiment of a smartphone case exterior with a separable camera on a tether.

Referring to FIG. 5, another example embodiment of the case 10 is shown having another example embodiment of a retractable extender mechanism. In this example embodiment, the retractable extender mechanism is a spring reel retractor 46. The case has the front wall 40 and the back wall 42 and the spring reel retractor 46 therebetween. The reel retractor 46 retracts and stores a cable 44 that connects to the adjunct camera 20. The cable 44 is capable of becoming taut when selectively extended and is preferably made from carbon fiber.

The case 10 has the recess 12 for storing the adjunct camera 20 flush with case. The adjunct camera 20 has a lens and a flash that store inwardly and the indicator 22 as described hereinabove. The case 10 has an opening 14 for a camera native to the smartphone.

The adjunct camera 20 communicates with the smartphone wirelessly via the app as described hereinabove allowing images to be selectively saved, shared and streamed by the smartphone directly from the adjunct camera. The smartphone controls the adjunct camera 20 through the app and the pairing between the smartphone and adjunct camera 20 is maintained as long as the app is open.

The case 10 has the rechargeable battery that recharges the adjunct camera 20 when the adjunct camera is connected to the cable 22. The adjunct camera 20 selectively detaches from the cable 44 to use as a hands-free device. The rechargeable battery recharges through the USB port 16.

It is understood that the case 10 is suitable for other handheld electronic devices as explained hereinabove by modifying the dimensions of the case and the ratio of length to width of the case. The case has the front wall 40 and the back wall 42 and a spring reel retractor 46 therebetween. The reel retractor 46 retracts and stores a cable 44 that connects to the adjunct camera 20 as explained hereinabove. The handheld electronic device has the app 50 for pairing and controlling the adjunct camera 20 by the device as described hereinabove.

Figure 4:
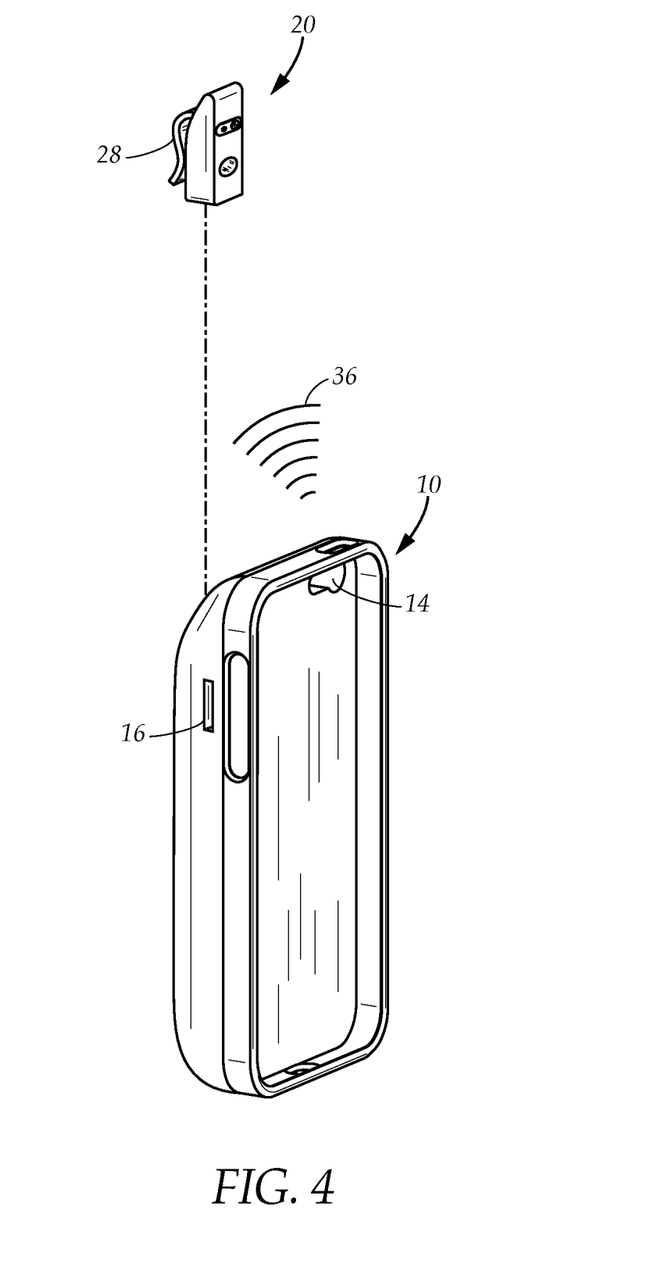
FIG. 4 is a perspective of another example embodiment of smartphone case exterior with a separable camera.

FIG. 4 shows yet another example embodiment of the case 10. The case 10 has the adjunct camera 20, a fastener 28 on the adjunct camera operative to attaching the adjunct camera to a user and the recess for storing the adjunct camera flush with the case. The fastener 28 can be, but not limited to, a clip, a hook and loop strip, a hook, a clasp, or a pin. The fastener 28 allows a user to attach the adjunct camera 20 to an object on his or her person for hands-free use of the adjunct camera. The object can be something the person wears or carries or alternatively, a part of a vehicle transporting the user. The smartphone in the case 10 is secured in a pocket or pouch once pairing is complete so that hands-free streaming is possible.

The adjunct camera 20 has the lens 24 and the flash 26 that face inwardly when the adjunct camera is stored in the case recess as described hereinabove. The adjunct camera 20 has the indicator light indicating pairing as described hereinabove. The case 10 has the opening 14 for the camera native to the smartphone.

As described hereinabove, the adjunct camera 20 communicates with the smartphone wirelessly via the app as described hereinabove allowing images to be selectively saved, shared and streamed by the smartphone directly from the adjunct camera. The smartphone controls the adjunct camera 20 through the app and the pairing between the smartphone and adjunct camera 20 is maintained as long as the app is open.

The adjunct camera 20 recharges when stored in the recess, drawing from the battery in the case 10. The battery recharges through the USB port 16.

It is understood that the case 10 is suitable for other handheld electronic devices as explained hereinabove by modifying the dimensions of the case and the ratio of length to width of the case. The case has the recess for storing the adjunct camera. The handheld electronic device has the app 50 for pairing and controlling the adjunct camera 20 by the device as described hereinabove.

In the example embodiments of the adjunct camera described hereinabove, the adjunct camera may have a microphone to capture audio synchronically with the video images. In other example embodiments, the audio is captured synchronically by the microphone in the smartphone or handheld electronic device through the app controlling the adjunct camera.

It is understood that in all the example embodiments described hereinabove, the case can be supplied without the adjunct camera and that the adjunct camera capable of fitting into the recess of the case and pairing with the smartphone or handheld electronic device through the app can be supplied separately.

Figure 6:
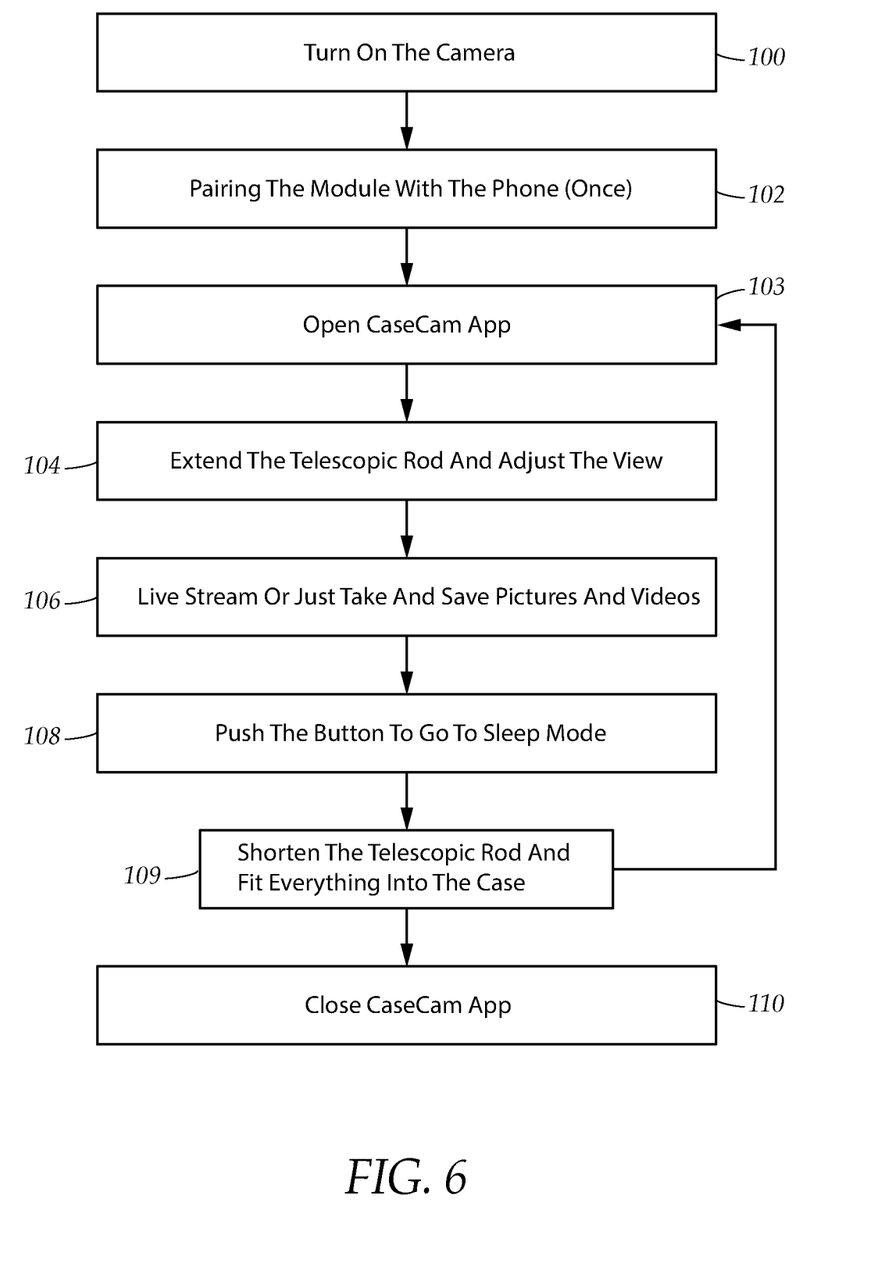
FIG. 6 is a block diagram of the steps performed by an example embodiment of an application in the system on the smartphone for controlling the external camera.

FIG. 6 outlines the method of pairing the adjunct camera to the smartphone or handheld electronic device in an example embodiment of a system. The case, the adjunct camera, the electronic device and the app comprise the system for capturing, streaming and saving video and photos by expanding the reach of the native camera function of the electronic device.

The first step 100 is to activate the adjunct camera, which may be done by removing the adjunct camera from the recess. Alternatively, the adjunct camera has a power switch. In another example embodiment, turning on the camera opens the software application (app) on the smartphone or handheld electronic device. In a further example embodiment, opening the app activates the adjunct camera.

The adjunct camera pairs with the smartphone or electronic device 102. The app opens 103. The user extends the rod or cable and adjusts the camera view 104. The adjunct camera streams videos or captures photos and video for saving 106. The adjunct camera goes into a standby or sleep mode 108 and the adjunct camera and smartphone remaining paired. The adjunct camera is placed in the recess and the cable or rod is retracted 109. The app opens again 103 and the sequence is repeated until the app is closed and pairing disabled when the camera is turned off 110.

This is one example embodiment of the interaction in the system of the adjunct camera and other sequences of the steps are possible within the inventive concept.

The disclosed embodiments may individually and/or collectively be components of a larger system, wherein other procedures may take precedence over or otherwise modify their application. Also, a number of steps may be required before, after, and/or concurrently with the following embodiments.

As will be appreciated by one skilled in the art, aspects of the present disclosure may be embodied as a system, method or computer application. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer application embodied in one or more computer readable medium(s) having computer readable program code embodied thereon.

Computer code for carrying out operations for aspects of the present disclosure can be written in any combination of one or more programming languages. The code may execute entirely on the user's smartphone or handheld electronic device, partly on the user's smartphone or handheld electronic device, as a stand-alone software package, partly on the user's smartphone or handheld electronic device and partly on a remote computing device, such as a server, or entirely on the remote computing device. In the latter scenario, the remote computing device may be connected to the user's computing device through any type of network, including a local area network (LAN) or a wide area network (WAN), or the connection may be made to an external computing device (for example, through the Internet using an Internet Service Provider) or cellular network.

The computing device for carrying out operations for aspects of the present disclosure can be, but is not limited to, a server, a desktop computer, a laptop computer, a tablet computer, a smartphone or another handheld digital device.

Aspects of the present disclosure are described below with reference to flowchart illustrations and/or block diagrams of methods, systems and computer applications according to embodiments of the disclosure. Each block of the flowchart illustrations and/or block diagrams, and combinations of blocks in the flowchart illustrations and/or block diagrams, can be implemented by software application instructions. These software application instructions may be provided to a processor of a general purpose electronic device, special purpose electronic device, or other programmable data processing apparatus to produce a machine, such that the instructions, which execute via the processor of the electronic device or other programmable data processing apparatus, create means for implementing the functions/acts specified in the flowchart and/or block diagram block or blocks.

The flowchart and block diagrams in the Figures illustrate the architecture, functionality and operation of possible implementations of systems, methods and computer application applications according to various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The flow diagrams depicted herein are just one example. There may be many variations to this diagram or the steps (or operations) described therein without departing from the spirit of the disclosure. For instance, the steps may be performed in a differing order and/or steps may be added, deleted and/or modified. All of these variations are considered a part of the claimed disclosure.

While the preferred embodiment to the disclosure had been described, those skilled in the art, both now and in the future, may make various improvements and/or enhancements which fall within the scope of the claims which should be construed to maintain the proper protection for the disclosure first described.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a case for a smartphone or handheld electronic device with an adjunct camera controlled by the device. The disclosure is illustrated by example in the drawing figures, and throughout the written description. It should be understood that numerous variations are possible, while adhering to the inventive concept. Such variations are contemplated as being a part of the present disclosure.

What is claimed is:

1. A case for a handheld electronic device, comprising:
   an adjunct camera in wireless communication with a handheld electronic device disposed within a case, wherein the adjunct camera has a lens and a flash, the lens and flash facing inwardly toward the handheld electronic device when the adjunct camera is stored in the recess of the case;
   an attachment mechanism on the adjunct camera operative to attach the adjunct camera to an object; and
   a recess for storing the adjunct camera such that when the adjunct camera is in the recess the adjunct camera is flush with the case.

2. The case as described in claim 1, wherein the case has an opening for a native camera, the native camera an integrated component of the handheld electronic device.

3. The case as described in claim 1, wherein the adjunct camera pairs with the handheld electronic device disposed within the case via an app on the handheld electronic device, the app allowing images to be selectively saved, shared and streamed by the handheld electronic device directly from the adjunct camera.

4. The case as described in claim 3, wherein the handheld electronic device controls the adjunct camera through the app.

5. The case as described in claim 4, wherein the adjunct camera has an indicator that is activated when the adjunct camera is paired to the handheld electronic device.

6. The case as described in claim 5, wherein the adjunct camera goes into a sleep mode when the app is open and the adjunct camera is not in use, maintaining the pairing of the handheld electronic device and the app.

7. The case as described in claim 1, further comprising a rechargeable battery that recharges the adjunct camera when the adjunct camera is stored in the recess of the case.

8. The case as described in claim 7, wherein the rechargeable battery recharges through a USB port.

9. A case for a handheld electronic device, comprising:
   an adjunct camera in wireless communication with a handheld electronic device disposed within the case, wherein the adjunct camera has a lens and a flash, the lens and flash facing inwardly toward the handheld electronic device when the adjunct camera is stored in the case recess;
   a retractable extender mechanism on the adjunct camera configured for extending the adjunct camera away from the case; and
   a recess for storing the adjunct camera such that when the adjunct camera is in the recess the adjunct camera is flush with the case.

10. The case as described in claim 9, wherein the case has an opening for a native camera, the native camera an integrated component of the handheld electronic device.

11. The case as described in claim 9, wherein the retractable extender mechanism is a telescoping rod having a top end with a swivel joint connecting the adjunct camera to the rod, the swivel joint allowing the adjunct camera to rotate into a plurality of positions.

12. The case as described in claim 11, wherein the case has a recess for storing and concealing the telescoping rod, such that when the adjunct camera and the telescoping rod are in the recess, the adjunct camera and the telescoping rod are flush with the case.

13. The case as described in claim 9, wherein the adjunct camera pairs with the handheld electronic device disposed within the case via an app on the handheld electronic device, the app allowing images to be selectively saved, shared and streamed by the handheld electronic device directly from the adjunct camera.

14. The case as described in claim 13, wherein the handheld electronic device controls the adjunct camera through the app.

15. The case as described in claim 14, wherein the adjunct camera has an indicator that is activated when the adjunct camera is paired to the handheld electronic device.

16. The case as described in claim 15, wherein the adjunct camera goes into a sleep mode when the app is open and the adjunct camera is not in use, maintaining the pairing of the handheld electronic device and the app.

17. The case as described in claim 9, further comprising a rechargeable battery that recharges the adjunct camera when the adjunct camera is stored in the recess.

18. The case as described in claim 17, wherein the rechargeable battery recharges through a USB port.

* * * * *